(12) United States Patent
Zabrodin et al.

(10) Patent No.: US 10,830,705 B2
(45) Date of Patent: Nov. 10, 2020

(54) METHOD AND DEVICE FOR SPECTRAL ANALYSIS OF A CHEMICAL COMPOSITION OF MOLTEN METALS

(71) Applicants: Aleksandr Nikolaevich Zabrodin, Cherepovets (RU); Sergei Aleksandrovich Zabrodin, St.Petersburg (RU)

(72) Inventors: Aleksandr Nikolaevich Zabrodin, Cherepovets (RU); Sergei Aleksandrovich Zabrodin, St.Petersburg (RU)

( * ) Notice: Subject to any disclaimer, the term of this patent is extended or adjusted under 35 U.S.C. 154(b) by 0 days.

(21) Appl. No.: 16/626,898

(22) PCT Filed: Jun. 29, 2018

(86) PCT No.: PCT/RU2018/000433
§ 371 (c)(1),
(2) Date: Dec. 27, 2019

(87) PCT Pub. No.: WO2019/009765
PCT Pub. Date: Jan. 10, 2019

(65) Prior Publication Data
US 2020/0116642 A1  Apr. 16, 2020

(30) Foreign Application Priority Data

Jul. 5, 2017 (RU) ................................. 2017123732

(51) Int. Cl.
*G01J 3/28* (2006.01)
*G01N 21/69* (2006.01)
(Continued)

(52) U.S. Cl.
CPC ............ *G01N 21/69* (2013.01); *G01J 3/0208* (2013.01); *G01J 3/0218* (2013.01); *G01J 3/443* (2013.01);
(Continued)

(58) Field of Classification Search
CPC ...... G01J 3/443; G01J 3/18; G01J 3/28; G01J 3/02; G01N 21/63; G01N 21/67; G01N 21/69
See application file for complete search history.

(56) References Cited

U.S. PATENT DOCUMENTS

| 4,986,658 A | * | 1/1991 | Kim ...................... G01J 3/0291 356/318 |
| 4,995,723 A | | 2/1991 | Carlhoff et al. |

(Continued)

FOREIGN PATENT DOCUMENTS

| RU | 2252412 C2 | 5/2005 |
| RU | 2273841 C1 | 4/2006 |

(Continued)

*Primary Examiner* — Abdullahi Nur

(57) ABSTRACT

The invention relates to the field of spectral analysis of the chemical composition of ferrous and non-ferrous metals and can be used in metallurgical factories to monitor the ongoing production of molten (liquid) electrically conductive materials directly in the melting units.

A method for optical emission spectral analysis of the chemical composition of an electrically conductive metal melt includes the following steps: immersion of a refractory probe with a sampler into a container with a metal melt at an angle to its surface, ingress of the metal melt into the sampler due to the ferrostatic pressure and stabilization of its level due to an inert gas flow, excitation of plasma torch using electric spark from an electrode located inside the sampler, transfer of the plasma glow through the optical channel to the input of the spectrometer, receiving a spectrum of the chemical elements in the metal, processing this spectrum in the computer to evaluate composition and the mass fraction of the chemical elements in the melt, wherein when measuring the level of the liquid sample in the sampler is stabilized and maintained at the level of the lateral opening in the wall of the sampler due to the flow of inert (Continued)

gas, which is continuously fed into the probe and comes out as bubbles through the hole directly into the melt medium. The technical effect: increase in sensitivity and accuracy of spectral analysis of electrically conductive melts, increase in reliability and simplification of the device for plasma excitation.

6 Claims, 3 Drawing Sheets

(51) Int. Cl.
| | | |
|---|---|---|
| *G01J 3/02* | (2006.01) | |
| *G01J 3/443* | (2006.01) | |
| *G01N 21/67* | (2006.01) | |
| *G01N 21/71* | (2006.01) | |
| *G01N 21/85* | (2006.01) | |

(52) U.S. Cl.
CPC ............ *G01N 21/67* (2013.01); *G01N 21/718* (2013.01); *G01N 21/8507* (2013.01)

(56) References Cited

U.S. PATENT DOCUMENTS

| | | |
|---|---|---|
| 5,699,155 A | 12/1997 | Sugihara |
| 7,365,841 B2 | 4/2008 | Plessers et al. |
| 7,748,258 B2 | 7/2010 | Sattmann |
| 2003/0197125 A1 | 10/2003 | De Saro |

FOREIGN PATENT DOCUMENTS

| | | |
|---|---|---|
| RU | 2319137 C1 | 3/2008 |
| RU | 2408871 C2 | 1/2011 |
| WO | 03081287 A2 | 10/2003 |
| WO | 2007012440 A1 | 2/2007 |

\* cited by examiner

METHOD AND DEVICE FOR SPECTRAL ANALYSIS OF A CHEMICAL COMPOSITION OF MOLTEN METALS

The invention relates to the field of spectral analysis of the chemical composition of ferrous and non-ferrous metals and can be used in metallurgical shops for ongoing production monitoring of molten (liquid) electrically conductive materials directly in melting units.

OBJECT OF THE INVENTION

The object of the invention is a method for optical emission spectral analysis of metals with excitation of high-temperature plasma in inert gas medium directly on molten metal using electric spark method, and an immersion refractory probe device that ensures the formation and retention of molten metal sample at a certain level in the sampler. At the same time, the device for spectral analysis contains a immersion refractory probe with a sampler and built-in electrodes, a manipulator rod, an electric spark generator with cables for connecting electrodes, a cylinder with compressed inert gas and a gas supply channel leading to the probe, an optical system with a light guide, a spectrometer and a computer for controlling and processing received spectra.

BACKGROUND OF THE INVENTION

Spectral analysis of the chemical composition of various materials is widely used in industry and, in particular, metallurgy, for example, when melting steel, cast iron or aluminum. Usually methods for spectral analysis used in practice require taking a metal sample from the melting unit; the sample is then cooled down, mechanically processed and then subjected to various analytical procedures. To analyze chemical composition of metals, atomic emission spectrometry is the most frequently used method, since it can be performed quite quickly, requires little work in sample preparation, and allows the simultaneous determination of a large number of chemical components. Emission spectrometry is based on heating a local surface area of a solid sample of the material to be analyzed to a temperature at which the ionization of the substance it consists of is achieved. Then, the radiation emitted by the plasma is analyzed in a spectrometer wherein this radiation is divided into different wavelengths corresponding to the elements of the substance present in the material. Equipment for the analysis of various materials using emission spectrometry is either a stationary laboratory equipment or portable mobile equipment. There is a difference between spectrometers of various types, in terms of the arrangement of the optical circuit and the method for decomposition of the analyzed radiation into a spectrum, as well as the arrangement of a system for recording spectral lines. The most common spectrum recording systems in the considered area are equipped with photomultipliers or charge-coupled device (CCD) systems or CMOS structures (complementary metal-oxide-semiconductor structures).

The economic interest in the method for spectrometric analysis of various materials is quite high, since such analysis is usually used in industry, where it provides the ability to track, monitor and control the entire flow of material production technology. However, existing methods and devices for spectral analysis take a rather long time for this procedure, which can be measured in tens of minutes. During continuous melting production, every minute of downtime, pending the results of the analysis, entails significant financial losses. Therefore, the need to ensure the profitability of the production process naturally makes it necessary to look for the fastest ways to study materials, which are respectively the least expensive. Therefore, the interest to the operational measurement of a chemical composition of melted materials directly in melting tank is quite obvious. In this case, the time for determining the chemical composition of the liquid melt can be only a few dozens of seconds.

In the course of the patent search, several published methods and devices for optical emission spectral analysis of the chemical composition of molten (liquid) materials were studied, with the exception of methods using analysis of cooled (solid) samples.

U.S. Pat. No. 4,995,723 B2 discloses a method based on measuring emission spectrum of a material molten in a metallurgical tank and excited by a laser radiation, which includes applying a laser beam and receiving the analyzed radiation through an opening in the side or bottom wall of the reservoir with the melt. In this case, the melt is prevented from flowing out through the opening by supplying compressed inert argon gas through this opening.

WO 03/081287 A2 discloses a method for analyzing molten materials, in particular aluminum, using a tube-shaped immersion probe. The open end of the tube is immersed in molten aluminum. Inside the carrier tube a lens system is provided. At the upper end of the tube the optical fiber is connected through the optical system, on the one hand to the spectrograph, and on the other hand to the laser. The radiation excited by the laser in the melt is directed through the optical fiber to the spectrograph and is analyzed there to obtain analytical results of the chemical composition of molten aluminum.

U.S. Pat. No. 7,365,841 B2 discloses a method and apparatus for analyzing molten material using a disposable immersion sensor. The sensor has a sensitive element having an emission spectrometer, a device for exciting molten material and a device for transmitting information. The sensor provides the generation of radiation for analysis using spectrometer, placed within the sensitive element. The sensitive element is brought into contact with the molten material and transmits information from the spectrometer to external device.

U.S. Pat. No. 7,748,258 B2 discloses a method for producing and forming a sample of molten material by flowing through a tube into a container of a sampler immersed in the melt. In this case, it is suggested to excite the plasma on the liquid material flowing into the sampler using laser radiation.

WO 2007012440 A1 discloses a method for analyzing liquid metal, wherein a laser beam is directed into a container with molten metal through a carrier tube with its open end immersed into the melt. In the place where the laser beam meets the surface of the liquid metal, impurities on its surface are removed by the stream of inert gas.

US 20030197125 A1 discloses methods for exciting plasma on molten materials using various methods, including laser, x-ray and electric spark, which involve inflating a bubble in a liquid medium with a compressed inert gas through an immersion probe. Besides, the stability of the inner surface level of the liquid metal in the bubble is controlled by special sensors connected to the inert gas supply control system. However, such a system is very complex and difficult to implement in practice, especially when rapidly changing the parameters of immersion, temperature or melt viscosity, when the surface of a gas bubble in a liquid metal will fluctuate.

Most known methods for the spectral analysis of metals in a molten (liquid) state use plasma excitation on the test object using a laser beam. As a result, the test object emits thus induced radiation, which is subject to analysis by an emission spectrometer. At the same time, the spectrometric equipment should be spaced sufficiently far from the hot metal, in accordance with the practical capability of its use in the operating conditions of a steel mill. The radiation emanating from the object of analysis can be directed to the spectrometer in various ways, for example, through a fiber optic cable, a light guide with mirrors, etc. To excite the emission spectrum, it is suggested to use a laser system with various optical equipment to direct the laser beam to the molten material. At the same time, this equipment, as a rule, should be placed above the object of analysis, for example, above a ladle with molten metal in a converter. From the industrial production practice it is possible to state that the conditions near the places for the molten metals production, such as a steel mill, are very aggressive with respect to the measuring equipment used to control them. Optical devices are particularly sensitive to these factors. This leads to the fact that the use of laser equipment may cause various technical problems. In addition, any development related to the use of laser equipment in the metallurgical industry is rather expensive to operate and often prone to malfunctions, accidents and low reliability at high temperatures, severe smoke and dustiness of the atmosphere.

Furthermore, laser methods for spectral analysis have such disadvantages as low accuracy of analysis due to the instability of the laser-excited plasma. Also, in the process of laser plasma formation due to the evaporation of the material, along with atoms and molecular particles, small hot particles of sample material are also present. The latter create a sufficiently strong background radiation in the spectrum of the laser torch, which often does not allow using this spectrum for analytical purposes. In addition, a significant temperature inhomogeneity of the laser plasma torch leads to the fact that the spectral lines of the elements have very wide and even self-reversed radiation contours. Due to these reasons, the laser torch emission spectrum is practically not used in industrial spectral analysis.

On the other hand, the electric spark plasma excitation method for the spectral analysis of metals is more stable, reliable, simple, and is widely used in practice at present in most industrial analytical devices. Excitation of a plasma torch by means of an electric spark discharge allows for ensuring high sensitivity and accuracy of the spectral analysis, which is necessary to determine even the smallest concentrations of chemical elements in the composition of the studied metals. The accuracy of spectral analysis in existing electric spark spectrum analyzers is tens times greater than when using laser spectrometers, for example, of the LIBS type. In addition, the equipment of the spark generator is less expensive and more reliable than laser, quite simple to implement, durable in operation and well-developed in practice. Therefore, it is clearly sensible to use the electric spark method for exciting plasma on molten metals. At the same time, it becomes possible to determine in the composition of the melt not only the mass fraction of chemical elements of the metal, but also the composition and concentration of the gases dissolved in it, for example, oxygen, hydrogen and nitrogen.

As a prototype of the present invention, a method for spectral analysis of a metal melt is described in patent RU 2273841. The known method for spectral analysis of elements of a metal melt in a melting tank includes immersing a refractory probe into melt, exciting a laser beam, conducting the laser beam through a system of lenses and mirrors, creating plasma by directing the laser beam through a quartz glass onto the surface of the molten metal, directing the light created by the plasma, through the quartz glass, a system of lenses and optical fibers into a spectrometer, using a computer to analyze the obtained spectral lines. In the process of immersing the probe into a container with a molten metal from above the liquid sample of the analyzed melt is formed due to ferrostatic pressure as well as in the process of evacuating the melt inside the refractory tube or sleeve or inside a standard sampler enclosed in the immersion block of the probe where, to balance ferrostatic pressure of the melt, inert gas is supplied under static pressure by adjusting which the desired shape and level of the molten metal are obtained in the refractory tube or sleeve or in a standard sampler.

The prototype has the following disadvantages. As already mentioned above, the laser method used for exciting liquid melt leads to inhomogeneous ejection of the sample material substance during its intense explosive evaporation by the laser beam, which leads to spatial inhomogeneity and instability of the plasma torch glow. This leads to different intensities of luminescence in the spectral lines and, as a result, to different quantitative spectroanalysis data for repeated realizations (i.e., non-representative results). As experience shows, differences in the readings of quantitative analysis can reach tens or even hundreds of percent (they may vary by several times).

SUMMARY OF THE INVENTION

The object of the invention is to increase the sensitivity and accuracy of spectral analysis of the chemical composition of liquid electrically conductive melts and to simplify the equipment of plasma excitation system.

This object is achieved by the fact that to conduct optical emission spectral analysis of the chemical composition of the liquid metal melt, an electric spark method for excitation of plasma on the surface of the molten (liquid) metal sample is used rather than a laser method. The method involves immersion in a metallurgical container with molten metal, for example, in a ladle, furnace or converter of a refractory immersion probe with a sampler, into which a sample of liquid metal flows under the influence of ferrostatic pressure, wherein the sample of liquid metal is kept at a stable level due to inert gas flow, and excitation of a high-temperature plasma on the surface of this sample using an electrode of electric spark generator and transmission of plasma radiation to spectrometer using an optical system. The immersion probe can be lowered into the metallurgical tank to a predetermined depth and with an inclination at a certain angle to the surface of the melt with the help of a manual rod (for manual control) or a rod manipulator (for automated control).

In optical emission spectral analysis with an electric spark plasma excitation method, the constancy of the gap between the electrode of the spark generator and the sample surface of the analyzed metal is very important. A constant spark gap ensures the stability of the plasma torch in the analytical gap and, as a result, the accuracy of the spectral analysis of the chemical composition of the analyzed metal sample. A method for spectral analysis of molten metal suggested in the present invention provide varies methods and devices for creating a stable level of a liquid metal sample relative to the end of the spark generator electrode. This takes into account the need for constant purging of the spark gap zone with an inert gas, for example, argon, in order to maintain favorable plasma combustion conditions in the spark breakdown channel and to displace the remaining air from the analytical gap.

According to the present invention, the suggested method for optical emission spectral analysis of an electrically conductive melt with electric spark excitation of plasma involves immersing a refractory probe with a sampler into a container with molten metal. The probe immersion into molten metal is done using a special metal rod, which an optical head with a light guide, cables for connecting the spark generator electrodes, and an inert gas supply tube installed inside. A refractory (quartz or ceramic) tube is used as a liquid metal sampler, the upper end opening of which is connected to the intake of the immersion probe.

In the middle part of its wall said tube has at least one through lateral opening located spaced apart from the lower end of the tube. The lower opening of the tube is intended for liquid metal to flow into it. When using a tube with a closed (sealed) bottom end (such as a test tube), the filler opening is located on the side wall at the lower end of the tube. When the probe is immersed in the melt, liquid metal flows into it through the lower opening of the sampler tube under the influence of its ferrostatic pressure. On the other side of the sampler tube, through its upper end opening, an inert gas, for example argon, is fed at a slight overpressure. When the probe is immersed into a container with a melt, liquid metal flows into the sampler tube through its lower opening and reaches the level of lateral opening of the tube, where its level stops and stabilizes as a result of balancing the ferrostatic pressure of the melt, on the one hand, and the dynamic pressure of the incoming inert gas flow, on the other hand. This gas escapes in the form of bubbles through the lateral opening in the wall of the sampler tube directly into the liquid metal medium. At the same time, the level of liquid metal in the sampler remains relatively constant at the level of the lateral opening in a fairly wide range of the immersion depth of the probe in the melt. This is due to the constant difference in the pressures in the liquid metal medium between the lower filler opening and the lateral opening, since the distance between them does not change. At the same time, the pressure of the inert gas supplied to the sampler tube should be slightly higher than the ferrostatic pressure of the melt at the level of the lateral opening of the sampler tube. Thus, this ensures a stable level of liquid metal sample in the sampler tube at the level of its lateral opening and, therefore, provides stable gap between the spark generator electrode and the surface of the liquid metal sample.

The spark generator electrode is installed in the sampler tube at a distance of several millimeters above the level of the lateral opening. This distance is determined by the required size of the spark gap and is selected depending on the best conditions for excitation of the plasma torch. Usually, in most laboratory optical emission spectrum analyzers that use solid metal samples for spectral analysis of chemical composition in argon medium the working spark gap (analytical gap) between the sample surface and the end of the electrode is around several millimeters.

To ensure electrical contact between the molten metal sample flowing inside the sampler tube and the spark generator, a second electrode (counter electrode) is used, which is mounted on the immersion probe outside the sampler. When the probe is immersed into a container with molten metal, this electrode provides electrical contact with the sample of molten metal in the sampler tube through the medium of the electrically conductive melt in the melting unit.

To ensure the ease of measurement and better conditions for observing a plasma torch in the spark gap, an immersion refractory probe can be lowered into the molten metal with the rod inclined at a certain angle to the level of its surface. The inclination of the rod with the integrated optical system makes it possible to observe the plasma torch at a certain side angle, since in this case the optical axis of the plasma observation system will pass through the lateral side of the plasma torch. In addition, the spark generator electrode is installed inside the sampler tube with an offset from the tube axis to its upper wall so as not to obscure the plasma torch in the analytical gap in the optical system of the spectrometer. In this case, it is desirable to orient the sampler tube in such a manner that the lateral opening intended for the inert gas output is directed mainly into the upper hemisphere.

According to the present invention, there is provided an additional method for optical emission spectral analysis of an electrically conductive melt, in which stabilization of the liquid metal sample level in the sampler is provided by the excess metal overflow into a hollow chamber. The sampler is a refractory (quartz or ceramic) tube with at least one lateral opening in its wall. The upper end opening of the sampler tube is connected to the opening in the refractory immersion probe, and part of the tube with the outlet lateral (overflow) opening is inside the hollow refractory chamber, which is also connected to the immersion probe. The lower end of the sampler tube with the lower (filler) opening is outside the hollow chamber. The internal cavity of this refractory chamber is isolated from molten metal and is in communication with the atmosphere through a special opening in the immersion probe. When a probe with a hollow refractory chamber is immersed into a container with molten metal, the molten metal flows into it through the lower filler opening of the sampler tube under the action of ferrostatic pressure. When the level of the flowing metal reaches the lateral opening in the sampler tube, the excess liquid metal overflows through this opening into the interior of the hollow chamber. Thus, at the level of the lateral opening of the sampler tube, the level of molten metal constantly flowing into it stops and stabilizes. In this case, the spark generator electrode is located in the sampler tube a few millimeters above the level of the liquid metal and excites a plasma torch, the glow of which is transmitted to the spectrometer using an optical system built into the rod. The time period of spectral analysis can be controlled by the rate of liquid metal flowing into the sampler tube through changing the size of the lower filler opening of the tube, as well as through the capacity of the hollow overflow chamber. In this case, the inert purge gas entering the sampler tube from the immersion probe freely exits through the same side overflow opening into the chamber cavity and then into the atmosphere through a special opening in the immersion probe. In addition, this method of spectral analysis with stabilization of the liquid metal level using overflow allows for obtaining a solid sample of metal, which flows and remains in the overflow chamber after removing the probe from the container with the melt.

DETAILED DESCRIPTION OF THE INVENTION

Figure 1:
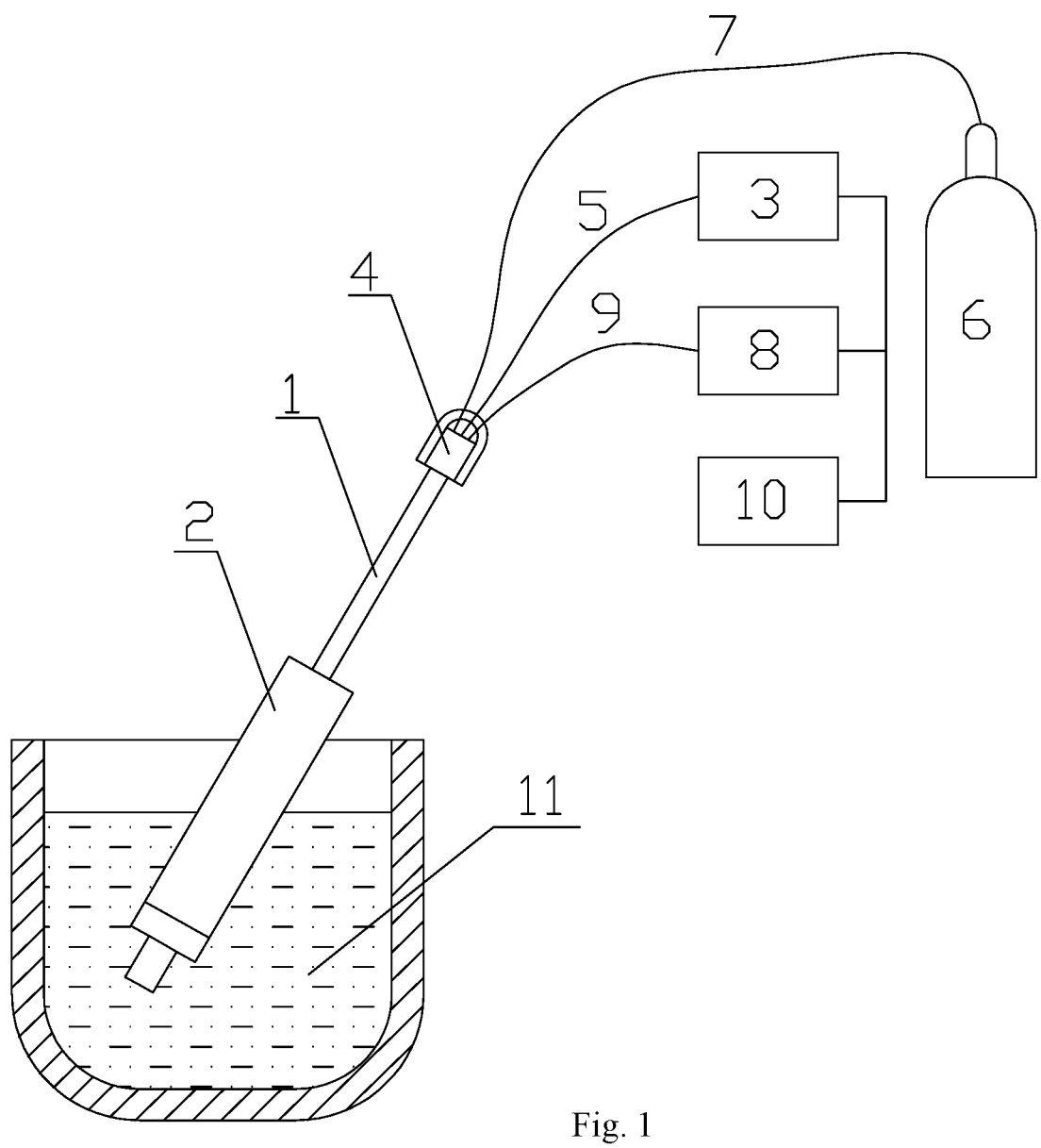
FIG. 1—general schematic view of the device for spectral analysis of a metal melt in a melting tank.
2.

According to the present invention, a device for performing spectral analysis of molten metal is suggested with its general view presented in FIG. 1. The device includes: a metal rod 1, an immersion refractory probe 2, an electric spark generator 3 with a discharger 4 and electrical connection cables 5, a cylinder 6 with a compressed inert gas, a tube 7 for supplying the inert gas to the immersion refractory probe 2, a spectrometer 8 with a light guide 9, as well as a computer 10 for controlling the measurement process and processing the obtained spectra. Before measuring, the immersion refractory probe 2 is put on the metal rod 1 and, when immersed in the container with an electrically conductive metal melt 11, it provides sampling of liquid metal in the sampler and protects the cables and optical devices in the rod from the effects of high temperature and aggressive melt medium.

Figure 2:
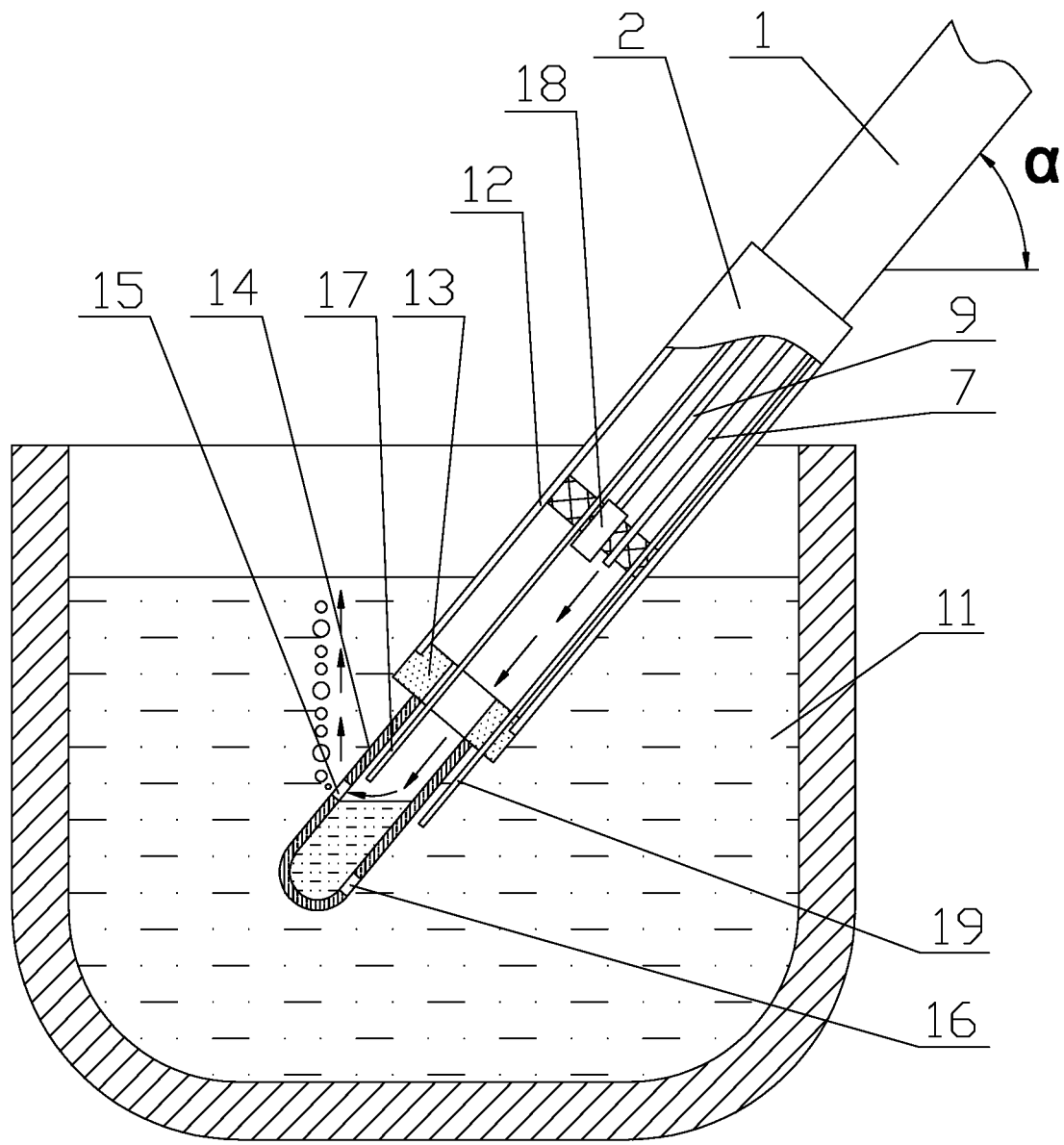
FIG. 2—sectional view of immersion probe with a sampler during spectrum measurement of a melt with gas stabilization of the liquid metal level.

A sectional view of an embodiment of the immersion refractory probe device for spectral analysis of molten metal is schematically shown in FIG. 2. According to the present invention the refractory probe 2 is a cardboard or ceramic tube 12 into which a ceramic or sand sleeve 13 is pressed. A refractory sampler 14, which is quartz or ceramic tube or a bulb with two openings, is integrated into this ceramic sleeve. The opening 15 in the tube side wall is configured to output the inert gas supplied through the gas tube 7 to the sampler tube. At a certain distance below the outlet opening 15 in the sampler there is an opening 16 through which molten metal flows into the sampler tube under the influence of ferrostatic pressure. This opening 16 can be located both on the lower end of the sampler 14 tube and on the side wall at the end of the tube if the bottom of the tube is closed (sealed). The closed-bottom sampler tube allows for obtaining a solid metal sample for subsequent analysis in a laboratory, since liquid metal does not completely leak out of the sampler after removing the immersion probe from the container with molten metal and, gradually cooling, it remains at the bottom of the sealed tube below the opening 16. In addition, the lateral location of the lower filler opening allows to avoid direct hydraulic shock of liquid metal in the sampler tube during melting of the slag protective cap, which usually covers the quartz tube of the sampler to prevent its destruction and ingress of slag and metal oxide impurities from the surface of the melt during the probe immersion into a container with molten metal 11.

An electrode 17 (for example, of tungsten or copper) of a certain length and diameter is installed inside the immersion probe. This electrode is placed in the sampler 14 tube and is offset from the central axis to its upper side wall so as not to obscure the plasma torch overview by the optical spectrometer system lens 18 in the analytical gap. At the same time, the end of the electrode 17 is located several millimeters above the level of the lower edge of the lateral opening 15 in the sampler tube in accordance with the required spark gap to the surface of the liquid metal sample. The immersion probe also contains second external electrode 19, which is the counter electrode and is located outside the sampler tube. The lens 18 provides focusing and transmission of plasma radiation from the spark gap through the light guide 9 to the input of the spectrometer 8. Inert gas (for example, argon) is supplied from the cylinder 6 to the sampler via the tube 7 and purges the analytical spark gap between the surface of the liquid metal that flows into the sampler tube and the end of the electrode 17. The output of inert gas entering the sampler from the tube 7 under a slight overpressure occurs through the lateral opening 15 directly into the medium of the metal melt 11.

According to the present invention, the principle of operation of this device for spectral analysis of molten metal is as follows (see FIG. 1, FIG. 2). The immersion refractory probe 2 is lowered to a predetermined depth in a container with molten metal 11 at a certain angle α to the surface of the melt using the rod 1. When immersing, the inert gas (for example, argon) from the cylinder 6 is continuously supplied under continuous slightly excessive pressure through the gas tube 7 to the sampler 14 via the central opening of the ceramic sleeve 13 of the immersion probe. Then this gas exits through the opening 15 in the side wall of the sampler 14 tube in the form of bubbles directly into the liquid metal 11 medium. The immersion probe 2 is attached to the rod 1 in such a way that the outlet lateral opening 15 of the sampler tube is directed mainly upward. After immersing the probe 2 to a predetermined depth, the protective cap put on the sampler tube melts and the liquid metal flows under the influence of ferrostatic pressure into the sampler tube through the lower opening 16. When the level of the liquid metal reaches the level of the lateral opening 15, further filling of the sample tube with the metal stops. This is due to the pressure compensation of the molten metal flowing into the sampler by the dynamic pressure of the inert gas stream that continuously enters the sampler from the gas tube 7 and exits into the melt medium through the upper lateral opening 15 of the sampler. At the same time, the level of the liquid metal sample in the sampler is stabilized at the level of the lateral opening 15 and is practically independent of the probe immersion depth in the metal melt within the required measurement depths, since the difference in pressure of the liquid metal between the openings 15 and 16 is relatively constant. For a given inclination angle α of the immersion probe relative to the melt level, the value of the analytical spark gap is determined by the shortest distance between the surface of the liquid metal sample and the end of the electrode 17 in the sampler. A relatively constant level of the sample surface of the molten metal flown in inside the sampler ensures the excitation of a stable plasma torch, which allows for accurate quantitative optical emission spectral analysis of all the chemical elements in the metal under study. The measuring probe with a sampler is immersed in a metallurgical container with molten metal to the depth necessary for accurate chemical analysis without impurities of oxides and surface slag.

After filling the sampler tube with liquid metal, the electric spark generator 3 is turned on, thus supplying voltage pulses through the cables 5 and the spark gap 4 to the electrodes 17 and 19. This begins the process of sparking and excitation of plasma on the surface of the liquid metal in the sampler tube using the electrode 17. The counter electrode 19 provides electrical contact for the spark generator with the metal sample in the sampler through the medium of the electrically conductive melt 11. During the spark discharge, the plasma glow from the analytical gap is transmitted to the input of the spectrometer 8 through the lens 18 via the light guide 9 (an optical fiber cable or an optical tube). The viewing angle of the plasma torch by the lens 18 in the spark gap of the sampler depends on the angle α of the immersion probe inclination relative to the surface level of the molten metal and can be selected by tilting the rod. The plasma radiation transmitted through the light guide 9 to the input of the spectrometer 8 is converted into spectral lines in its optical system, which are then converted by the recording unit into electrical signals and transmitted to the computer 10 for processing and analysis of the chemical composition of the metal being analyzed. The immersion refractory probe should be removed from metallurgical container with molten metal after a certain residence time. This time spent by the probe in the molten metal should be sufficient to obtain and to average a certain set of spectra allowing for measuring the exact composition and mass fraction of the chemical elements in the metal being analyzed.

Figure 3:
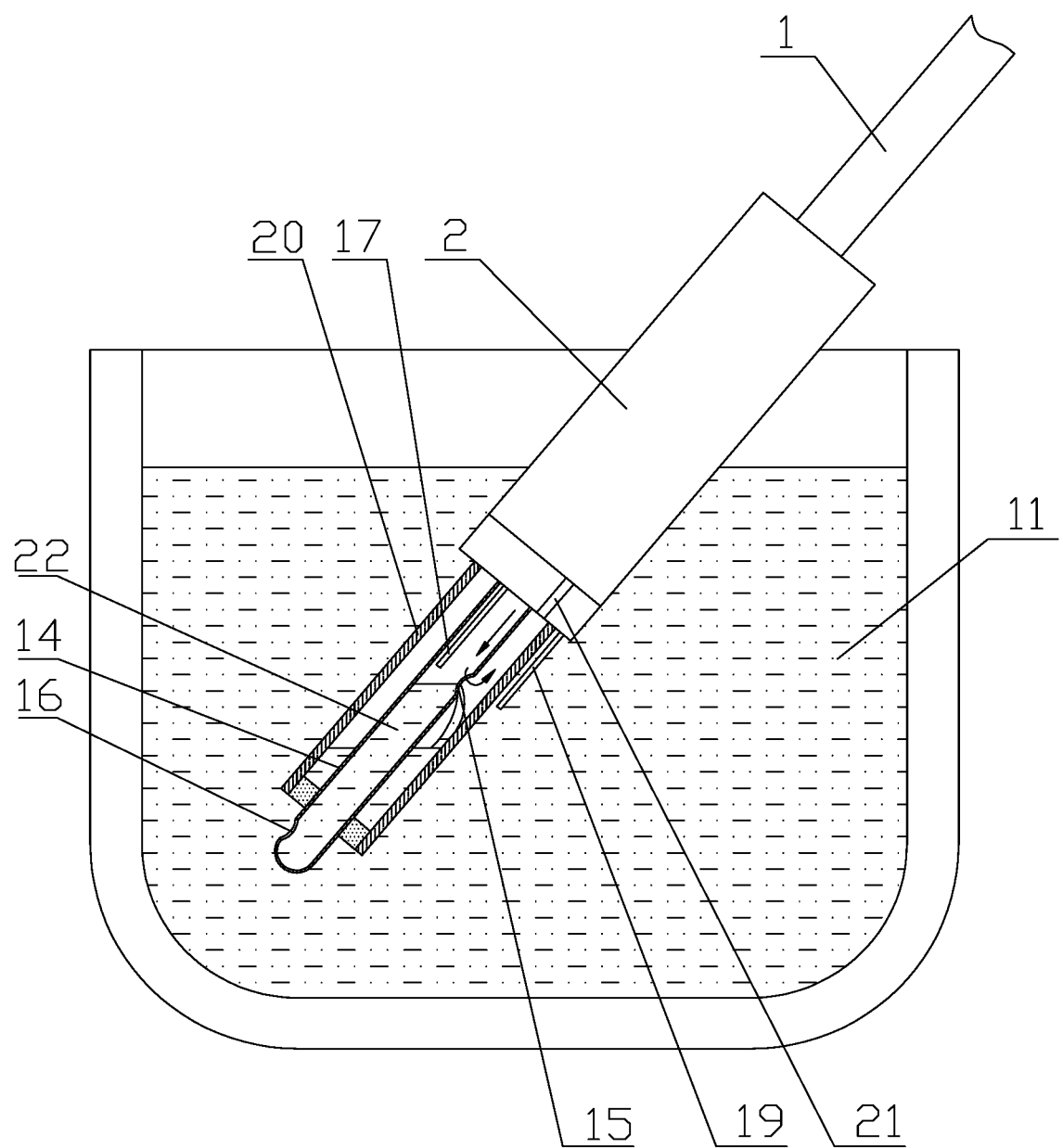
FIG. 3—sectional view of an immersion probe with a sampler during the measurement of the melt spectrum with a liquid metal overflow into a hollow chamber.

According to the present invention, to implement an additional method for optical spectral analysis of electrically conductive melts with spark plasma excitation, a device of FIG. 3 is suggested. In this device, to stabilize the metal level in the sampler 14 tube, the principle of excess metal overflow through the opening 15 in its side wall into the cavity of the special refractory chamber 20 is used. The refractory chamber 20 is a cardboard or ceramic tube closed from the lower end with a ceramic or sand plug. The internal cavity of the chamber is isolated from the molten metal and is in communication with the atmosphere through a special opening 21, (conventionally shown in the figure) in the immersion probe 2 housing. In this case, the upper part of the sampler 14 tube with the lateral overflow opening 15 is inside the cavity of the refractory chamber 20, and the lower end of the sampler 14 tube with the inlet opening 16 extends outside the refractory chamber.

The principle of this device operation is as follows. After immersion of the refractory probe 2 with the aid of the rod 1 in the melt with liquid metal 11 to a certain depth, the sample of molten metal 22 flows into the sampler 14 tube through the lower filler opening 16 and rises to the level of the upper outlet opening 15 under the influence of ferrostatic pressure. Through this opening, the excess metal from the sampler tube flows for a certain time into the cavity of the refractory chamber 20. The liquid metal level in the sampler tube temporarily stabilizes at the level of the outlet opening 15. During this period of time, using the internal electrode 17 plasma is excited on the surface of the liquid metal flowing into the sampler tube. The external electrode 19 provides electrical contact with the electrode 17 through a medium of electrically conductive melt. Due to the overflow of the excess metal, a relatively stable value of the discharge gap between the end of the electrode 17 and the surface of the liquid metal continuously flowing into the sampler is maintained for some time. In this case, the inert purge gas, continuously entering the sampler tube from the immersion probe, freely enters the cavity of the immersion refractory chamber through the overflow outlet opening 15 and then into the atmosphere through a special internal opening 21 in the immersion probe without exerting pressure on the flowing metal. The rate of the molten metal flowing into the sampler, and hence the time of spectral analysis of the metal sample, can be controlled using the cross-sectional size of the lower filler opening 16 and the capacity of the immersion hollow refractory chamber 20. In this device, a level sensor for filling the immersion chamber with flowing liquid metal can be used. This sensor gives a signal at a certain level of filling the immersion chamber with metal and allows for removing the immersion probe in time from the container with the melt. Contact, inductive or other control devices may be used as metal level sensors and are not considered here.

REFERENCES CITED

1. U.S. Pat. No. 4,995,723 B2.
2. Patent publication WO 03/081287 A2.
3. U.S. Pat. No. 7,365,841 B2.
4. U.S. Pat. No. 7,748,258 B2.
5. Patent publication WO 2007012440 A1.
6. Patent US 20030197125 A1.
7. Patent RU 2273841.

The invention claimed is:

1. A method for optical emission spectral analysis of the chemical composition of an electrically conductive melt, including immersing a refractory probe with a sampler into the metal melt, forming a molten metal sample therein due to the ferrostatic pressure; exciting a plasma torch on its surface, transmitting the plasma glow through an optical channel to the spectrometer's input, obtaining a spectrum of chemical elements of the molten metal therein, processing the resulting spectrum in a computer to assess the composition and mass fraction of the chemical elements in the melt, characterized in that in order to increase the sensitivity and accuracy of the optical emission spectral analysis, an electric spark method is used for excitation of plasma on the liquid metal sample in an inert gas stream medium using a spark generator electrode located in the sampler tube at a distance of the discharge analytic gap above the surface of the molten metal sample present in the tube, which is electrically connected through the medium of the metal melt with a counter electrode of the spark generator, wherein a stable level of liquid metal sample in the sampler tube is maintained at the level of the lateral opening in the middle part of its wall due to compensation of the ferrostatic pressure of the metal melt by the dynamic pressure of the inert gas stream, which continuously passes into the sampler tube from the immersion probe and exits through this lateral opening directly into the melt medium.

2. The method of claim 1, characterized in that the stabilization of the level of the liquid metal flowing into the sampler tube through the bottom opening is provided at the level of the lateral opening in the tube wall due to the excess liquid metal overflowing through it into a hollow refractory chamber surrounding the tube and the cavity of which is isolated from the melt medium and is in communication with the atmosphere.

3. The method of claim 1, characterized in that in the process of measuring the spectrum, a refractory probe with a sampler is immersed with a rod into the molten metal inclined to its surface at a certain angle, wherein the optical axis of the light guide lens passes at the same angle through the lateral side of the plasma torch excited by the electrode on the surface of the liquid metal sample in the sampler, and the electrode of the spark generator is offset from the axis of the sampler tube to the upper segment of its wall.

4. A device for spectral analysis of a molten metal in a melting tank, comprising: an immersion refractory probe with a sampler, a device for supplying inert gas to the sampler, an optical system with a light guide, a spectrometer and a computer, characterized in that the device comprises an electric spark generator with a discharger and electrodes connected to its outputs, while the refractory sampler is made in the form of a quartz or ceramic tube with its top end opening connected to the immersion probe with an integrated optical system and an inert gas supply device, the sampler tube itself has at least one opening in the middle part of the side wall for the inert gas to exit, and also has at least one opening in the lower part for the liquid metal to flow in, further, the immersion probe contains two refractory electrodes, one of which is installed in the sampler tube at a distance of the discharge gap above the lateral opening in the middle part of the tube and is offset from the tube's center to its wall, and the second electrode is located on the outside of the probe.

5. The device of claim 4, characterized in that a part of the sampler tube of the immersion probe with at least one lateral opening in its wall and an integrated electrode is located inside the hollow refractory chamber, and the lower part of the sampler tube with an opening for the liquid metal inflow is outside of the hollow chamber, moreover, the cavity of the refractory chamber is isolated from the melt medium and is in communication with the atmosphere through a special opening in the immersion probe.

6. The device of claim 5, characterized in that the lower central end opening of the sampler tube is closed or sealed, and at least one opening for the liquid metal inflow is located in the lower part of its side wall, while the size of this opening determines the rate of liquid metal inflow into the sampler tube.

\* \* \* \* \*